MARCELIN & SAUNDERS.
Acid Pan.
No. 77,826.
Patented May 12, 1868.
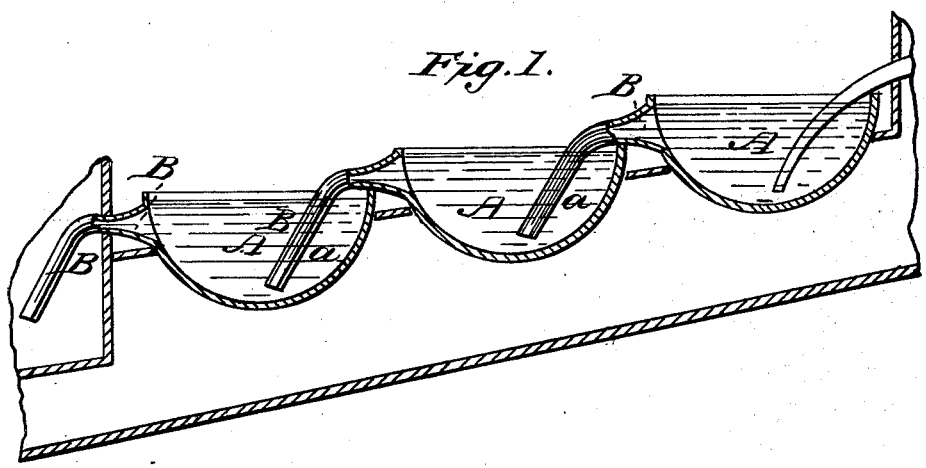
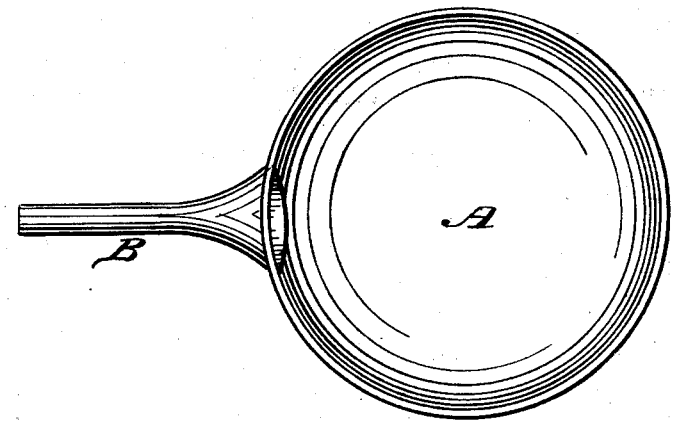
WITNESSES:
H. C. Ashketter
Wm A Morgan
INVENTORS
P. Marcelin
J. Saunders
per Munn
Attorneys

United States Patent Office.

P. MARCELIN AND JOSEPH SAUNDERS, OF GREEN POINT, NEW YORK.

Letters Patent No. 77,826, dated May 12, 1868.

IMPROVEMENT IN PANS FOR CONCENTRATING SULPHURIC ACID.

The Schedule referred to in these Letters Patent and making part of the same.

TO ALL WHOM IT MAY CONCERN:

Be it known that we, P. MARCELIN and JOSEPH SAUNDERS, of Green Point, in the county of Kings, and State of New York, have invented a new and improved Pan for Concentrating Sulphuric Acid; and we do hereby declare that the following is a full, clear, and exact description thereof, which will enable others skilled in the art to make and use the same, reference being had to the accompanying drawings, forming part of this specification.

Figure 1 represents a vertical longitudinal section of a set of our improved sulphuric-acid pans.

Figure 2 is a plan or top view of one of the same.

Similar letters of reference indicate corresponding parts.

This invention relates to a new manner of constructing pans for concentrating sulphuric acid, and its object is to produce a satisfactory circulation of the acid in the pans.

The invention consists in providing the pans with elongated, downward-extending spouts, which reach from the upper part of that pan to which they are attached, to close above the bottom of the next pan below, so as to carry the lighter impure contents of the upper pan to the bottom of the lower pan, and to thus create a complete circulation.

A, in the drawing, represents a pan, made of glass, earthenware, or other suitable material, of suitable size and shape. B is a tubular or other spout, projecting from the side of the pan, from near the upper part of the same.

The same spout has a downward extension, $a$, which reaches nearly to the bottom of the next pan, set below the first pan, a series of such pans being as usually set on an inclined plane of a furnace, as is indicated in fig. 1.

By this arrangement of elongated spouts the acid is carried from the upper part of one pan to the lower part of the other pan, and therefore a constant motion of the acid is produced in the pans, as the heavier parts of the acid are not allowed to settle in any pan, no sediment being possible, owing to the constant fresh supply of fresh acid to the lower part of each pan.

We claim as new, and desire to secure by Letters Patent—

Providing sulphuric-acid pans with elongated, downward-extending spouts B, for the purpose of carrying the acid from the upper part of one pan to near the bottom of the next pan below, substantially as herein shown and described.

P. MARCELIN,
JOSEPH SAUNDERS.

Witnesses:
WM. F. MCNAMARA,
ALEX. F. ROBERTS.